United States Patent
Li et al.

(10) Patent No.: US 6,735,580 B1
(45) Date of Patent: May 11, 2004

(54) ARTIFICIAL NEURAL NETWORK BASED UNIVERSAL TIME SERIES

(75) Inventors: Liang Li, Mission Viejo, CA (US); Yi Tang, Kendall Park, NJ (US); Bin Li, Westport, CT (US); Xiaohua Wu, Mission Viejo, CA (US)

(73) Assignee: Westport Financial LLC, Westport, CT (US)

( * ) Notice: Subject to any disclaimer, the term of this patent is extended or adjusted under 35 U.S.C. 154(b) by 530 days.

(21) Appl. No.: 09/648,878

(22) Filed: Aug. 25, 2000

Related U.S. Application Data

(60) Provisional application No. 60/150,790, filed on Aug. 26, 1999.

(51) Int. Cl.[7] .............................................. G06F 15/18
(52) U.S. Cl. ........................... 706/21; 706/30; 706/925
(58) Field of Search ........................ 706/30, 21, 925, 706/15, 19; 705/10, 35

(56) References Cited

U.S. PATENT DOCUMENTS

| | | | | |
|---|---|---|---|---|
| 5,109,475 A | | 4/1992 | Kosaka et al. ................. | 706/19 |
| 5,544,281 A | * | 8/1996 | Maruoka et al. ............... | 706/58 |
| 5,754,738 A | * | 5/1998 | Saucedo et al. ............... | 706/11 |
| 5,761,386 A | * | 6/1998 | Lawrence et al. ............. | 706/20 |
| 5,987,444 A | * | 11/1999 | Lo ............................... | 706/25 |
| 6,440,067 B1 | * | 8/2002 | DeLuca et al. ............... | 600/300 |
| 6,493,637 B1 | * | 12/2002 | Steeg ............................ | 702/19 |
| 6,493,691 B1 | * | 12/2002 | Neuneier et al. ............. | 706/45 |

FOREIGN PATENT DOCUMENTS

| | | | | |
|---|---|---|---|---|
| GB | 2 253 081 A | 3/2003 | ........... | G06F/15/21 |

OTHER PUBLICATIONS

Lawrence et al., "Noisy Time Series Prediction Using Symbolic Representation and Recurrent Neural Network Grammatical Inference", 1996, Retrieved from the Internet: http:// citeseer.nj.nec.com/lawrence97noisy.html.*

Schwaerzel et al., "Improving the Accuracy of Financial Time Series Prediction Using Ensemble Networks and High Order Statisitcs", Proceedings of the International Conference on Neural Networks, 1997.*

LeBaron et al., "Evaluating Neural Network Predictors by Bootstrapping", Proceedings of the International Conference on Neur Information Processing, 1994.*

Giles et al., "Rule Inference for Financial Prediction Using Recurrent Neural Networks", Proceedings of the IEEE/ IAFE Conference on Computational Intelligence for Financial Engineering, 1997; pp. 253–259.*

Saad et al., "Advanced Neural Network Training Methods for Low False Alarm Stock Trend Prediction", IEEE International Conference on Neural Networks, vol. 4, pp. 2021–2026, Jun. 1996.*

Roman et al., "Backpropagation and Recurrent Neural Networks in Financial Analysis of Multiple Stock Market Returns", Proceedings of the 29th Hawaii International Conference on System Sciences, vol. 2, pp. 454–460, Jan. 1996.*

\* cited by examiner

*Primary Examiner*—Wilbert L. Starks, Jr.
*Assistant Examiner*—Kelvin Booker
(74) *Attorney, Agent, or Firm*—St. Onge Steward Johnston & Reens LLC

(57) ABSTRACT

A neural network based universal time series prediction system for financial securities includes a pipelined recurrent ANN architecutre having a plurality of identical modules to first adjust internal weights and biases in response to a first training set representing a nonlinear financial time series of samples of a financial quantity and a target value, and then determine and store an estimated prediction error of the ANN in order to adjust short time stock price predictions in accordance with the stored prediction error. The prediction system is also designed to output upper and lower prediction bounds within a confidence region.

23 Claims, 4 Drawing Sheets

ARTIFICIAL NEURAL NETWORK BASED UNIVERSAL TIME SERIES

This application is based on a provisional patent application No. 60/150,790 filed Aug. 26, 1999.

FIELD OF THE INVENTION

The invention relates to a time series prediction system for financial securities utilizing Artificial Neural Network (ANN). More particularly, the invention relates to a processing system based on the recurrent ANN architecture capable of outputting upper and lower prediction bounds at any given confidence, which is based on the validation errors of the ANN. Specifically, the invention relates a prediction system that can be applied to any financial time series which can be called by any computer language and Web applications supporting the system.

BACKGROUND OF THE INVENTION

In the recent past, Recurrent Artificial Neural Networks have successfully improved the quality of forecasting of share movements in relation to its statistically based counterparts. The known recurrent neural networks (RNN) make a prediction of the appreciation potential of each stock based on the available historical data. The training process continues until at least one stopping criterion is met. Such criteria include the determination that the connections between the nodes of the net have reached a steady state, that the error between the predicted output and the actual target values is less than a certain threshold, or that a predefined time period has elapsed without any improvement in the net's performance. Once the neural nets for each stock of the capital market have been trained and tested on the available historical data the neural nets are tied to surpass the underlying market benchmark by predicting, the task becomes one of holding a smaller subset of all stocks of the market, such that this subset has a higher expected return and about the same level of risk as the market index. Such a task requires one to focus on individual stocks and their performance in relation to the index that serves as the underlying performance benchmark.

Individual stocks usually have their own unique performance characteristics some of which can be quantified. Clearly, however, the relationships among such data are complicated and frequently non-linear, making them difficult to analyze. In summary, an investment decision in the modern capital markets requires processing of large volumes of data and taking into account a number of factors which may exhibit significant non-linear relationships among different components of the data.

Computers, in general, are very adept at dealing with large amounts of numerical information. However, sophisticated techniques are required to analyze and combine disparate information that can potentially impact security prices. Several expert computer systems have been deployed in the domain of finance, including some in the area of investment management.

In the past several years, recurrent neural networks (RNN) have become popular in solving a variety of problems. Neural nets mimic the ability of the human brain to recognize recurring patterns that are not just identical but similar. A neural net can predict the value of one variable based on input from several other variables that can impact it. The prediction is made on the basis of an inventory of patterns previously learned, seeking the most relevant in a particular situation. In summary, RNNs can "learn" by example and modify themselves by adjusting and adapting to changing conditions. Several applications of neural nets to the domain of finance are already known in the art. Typically, the RNN prediction systems are "self" trained by adjusting weights and biases as a result of numerous repetitions. What the known systems typically do not do is to calculate an error function so the system's output can be adjusted or controlled in accordance with the determined error.

U.S. Pat. No. 5,109,475 to Kosaka et al. discloses a neural network for selection of time series data. This process is illustrated in a particular application to the problem of stock portfolio selection. In the first step of the proposed process, certain characteristics for each security are calculated from time series data related to the security. The characteristics to be computed include the historical risk (variance and co-variance) and the return. The following step involves the establishment of a performance function based on the calculated characteristics and, in the third step of the process, a Hopfield neural network is used to select a subset of securities from a predefined universe. Due to the fact that the Kosaka system only considers historical risk and return data, and implicitly assumes that the relationship between risk and return factors will remain stable in the future, in a typical rapidly changing market environment, it is unlikely to predict accurately price variations which are subject to complicated non-linear relationships.

U.K Pat. application 2 253 081 A to Hatano et al. discloses a neural net for stock selection using only price data as input. The main idea of the proposed system is to calculate runs (sequences) of price trends, increases and decreases, using a point-and-figure chart and using the maximum and minimum values from the chart to make a time-series prediction using a neural network. As in the previous case, the Hatano system only uses historic price data which places limitation on the type and quality of predictions that may be achieved. Additionally, the use of only the external points of the price chart obscures even further information about any time dependencies that might be present in the original data.

The above-described financial systems do not fully utilize the potential of the neural nets for stock selection. Notably missing is the possibility to develop the standard adaptive training procedure of the RNN to determine a prediction error or function in accordance to which the RNN output can be controlled. Further, many of the known investment management systems have not been able to effectively output the upper and lower error bounds at a given confidence level. Further, the movements of the stock prices, as well as price movements of other financial instruments, generally present a deterministic trend superimposed with some "noise" signals, which are, in turn, composed of truly random and chaotic signals, as illustrated in FIG. 1. Deterministic trends can be detected and assessed by some maximum-likelihood processes. Although a truly random signal, often represented by a Brownian motion, is unpredictable, it can be estimated by its mean and standard deviation. The chaotic signal, seemingly random but with deterministic nature, proves predictable to some degree by means of several analysis techniques, among which the ANN techniques have proven most effective over the widest range of predictive variables. However, this trend is largely ignored by the above-discussed references. As a result, at least some of the known systems are fed with data including this deterministic trend that influences the training stage of the known systems. Overall, many of the known systems are limited for the prediction of specific types of securities and data, such as the price of a single stock and, thus, cannot be universally applied to any financial time series, price series and volatility series.

It is, therefore, desirable to provide a prediction system based on the recurrent Artificial Neural Network (ANN) architecture which is able to output upper and lower predictions bounds at any given confidence level. Also, an ANN prediction that can be applied to financial time series, price series and volatility series, for single securities and for portfolios of securities is desirable. A universal prediction system employing a pipeline recurrent neural network (PRNN), which provides the satisfactory accuracy of the nonlinear and adaptive prediction of nonstationary signal and time series processes is also desirable. Further, a universal ANN prediction system having high computation efficiency and multi-stage adaptive supervised training process is also desirable.

SUMMARY OF THE INVENTION

Accordingly, an inventive universal ANN prediction system motivated in its design by the human nervous system is capable of learning by training to generalize from special cases and outputting a three-line band to forecast shortterm movements of stock prices.

Referring to one aspect of the invention, a supervised training and prediction system is so trained that the online investors are presented with the forecast of short-term movements of stock prices in a scientific way. Particularly, a three-line presentation that defines a confidence range or level, within which a price stock is predicted to fluctuate, enables the online investors to obtain a good understanding of the possible stock prices in a probability sense.

Such presentation becomes possible due a training procedure of a ANN prediction system in accordance with the invention. Particularly, a training set, which includes the input data for the ANN to "see" and the known target data for ANN to learn to output, is first collected. For stock price predictions, for example, the training set and target data would naturally be historical stock prices. A vector of 100 consecutive historical stock prices, for instance, can constitute a training data and the 101st stock price can be a target datum. The inventive process further is characterized by feeding the input data to ANN; compare ANN output with the known target, and adjust ANN's internal parameters (weights and biases) so that ANN output and the known target are close to one another—more precisely, so that a certain error function is minimized. Further, the process is characterized by feeding ANN some future input data (not seen by ANN); if ANN is well trained and if the input data is predictable, then ANN will give accurate predictions.

The inventive system is essentially an Artificial Neural Network trained for adaptive prediction of stock prices. During the prediction process, the inventive system (TradetrekTm Neuro-Predictorm) determines whether a particular stock is predictable with the accuracy required for a statistically significant prediction. This is accomplished, essentially, by comparing the ANN validation error against stock price fluctuations. We know that stocks with larger chaotic components and smaller truly random components tend to be more predictable than others.

In accordance with still another aspect of the invention, the deterministic or expected trend of the chaotic component of a signal representing the evaluated time-series data is determined in accordance with log-linear chisquared linear least squares based on the Black-Scholes stock price formula. The Black-Scholes formula, or other option pricing formula, is used to determine expected option costs in determining necessary hedging and pricing. The Black-Scholes formula provides an option cost based upon index price, exercise price, option term and assumptions of risk free rates of return, average dividend yield, and volatility of returns (standard deviation of returns). The trend is removed before feeding the data to the ANN engine and added back to the data in the post processing stage of the inventive process.

Overall, the simplified ANN (supervised) training and prediction process can be illustrated by the following steps.
Stage One:
Collect the training set, which includes the input data for the ANN to "see" and the known target data for ANN to learn to output. For stock price predictions, for example, the training set and target data would naturally be historical stock prices. A vector of 100 consecutive historical stock prices, for instance, can constitute training data and with the 101st stock price as a target datum.
Stage Two:
Feed the input data to ANN; compare ANN output with the known target, and adjust ANN's internal parameters (weights and biases) so that ANN output and the known target are close to one another—more precisely, so that a certain error function is determined and further minimized.
Step Three:
Feed ANN some future input data (not seen by ANN); if ANN is well trained and if the input data are predictable, then ANN will give accurate predictions.

The inventive system has managed to yield prediction refinements well beyond those of other systems by employing a pipelined recurrent ANN architecture (best for time-series prediction) and an adaptive supervised training procedure.

It is, accordingly, an object of the present invention to provide an artificial neural network system operating with a determined error function for data processing and predicting stock prices at a given confidence level.

It is yet another object of the present invention to develop a process for stock prediction on the basis of evaluation of the collected data using a neural network system.

Yet another object of the present invention is to provide a data processing system based on an artificial neural network employing a pipelined recurrent ANN architecture to provide the satisfactory accuracy of the nonlinear and adaptive prediction of time series process.

A further object of the invention relates to a component object module (COP) technique allowing any COM support computer languages and applications to call the inventive prediction system.

BRIEF DESCRIPTION OF THE DRAWINGS

The above and other objects, features and advantages will become more readily apparent from the following detailed description, which is accompanied by the following drawings, in which.

DETAILED DESCRIPTION OF THE DRAWINGS

Figure 2:
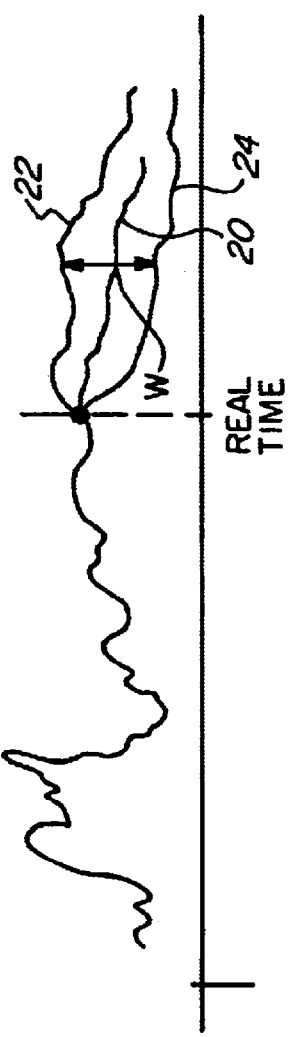
FIG. 2 is a graphical presentation of a three-line band forecast illustrating a time-series financial security exhibiting a predicted trend within upper and lower boundaries which define a confidence level in accordance with the invention.

Referring to FIGS. 2–6 and particularly to FIG. 2, a three-line band, which graphically presents a universal time series prediction system for financial securities stock price system and enables the online investors to obtain an illustrative understanding of the possible stock price movements. Particularly, price fluctuation of a stock 20 is traced for a period of time until a real time point at which financial time series prediction is outputted at a given confidence level. Specifically, the prediction system is capable of outputting upper 22 and lower 24 prediction bounds of the most likely price movement of a stock 20 which could be predicted within a confidence range W delimited by the upper and lower bounds. The confidence range depends on how well a prediction system is trained, and, in accordance with the invention, can be as high as 80%. This probability indicates that the stock 20 will remain between the lower and upper boundaries within the next few days. In order to obtain such a high probability, an artificial neural network (ANN) prediction system is trained in accordance with the inventive method better illustrated in FIGS. 3–7.

Figure 1:
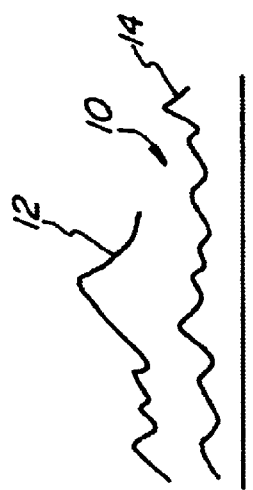
FIG. 1 is a graph representing a truly random signal and a chaotic or oscillating component of a stock.
Figure 3:
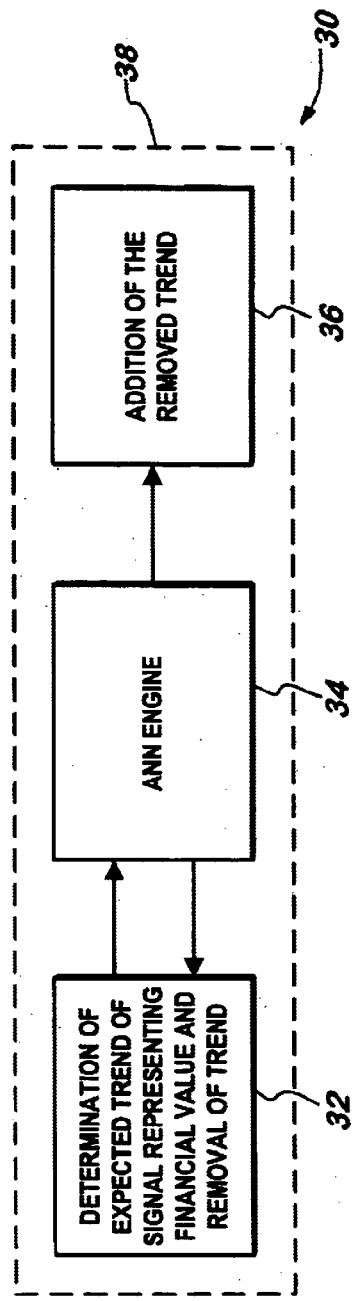
FIG. 3 is a basic flow chart generally illustrating a universal time series prediction system for financial securities in accordance with the invention.

The Neural Network Stock Prediction Engine 30 basically includes a three-step process, comprised of a pre-processing stage 32, training or learning stage 34 and a post-processing stage 36. The pre-processing stage includes software executing on a computer 38 for determination of the deterministic or expected trend of a financial time-series signal 10, which, as mentioned before and illustrated in FIG. 1 is comprised of a truly random component 12 and a chaotic component 14 which has the expected trend. The trend determination relies on certain chi-squared analysis based on Black-Scholes formula well known in the art. Particularly, for predicting prices of a single stock, log-linear chi-squared linear least squares analysis is used. For the prediction of the prices of a portfolio of stocks, linear chi-squared linear least squares analysis is used. For the prediction of other financial quantities, such as volatilities and the prices of other financial securities, the corresponding financial models (e.g., GARCH) are used in the pre-processing analysis. Different pre-processing processes can be selected dynamically at run time.

The basic idea of these processes is to minimize the following error function:

$$E = \Sigma w (f(x) - y)^2$$

where: x is time, y is the quantities of the particular item, such as stock prices to be predicted, f is the expected trend to be determined, w is the trading volume divided by the volatility or spread of the quantities y at the time x.

After this trend has been determined it is removed from the further training process, and after the Neural Network Stock Prediction engine (ANN) is trained at 34, it is added back to the prediction result at 36.

Figure 4:
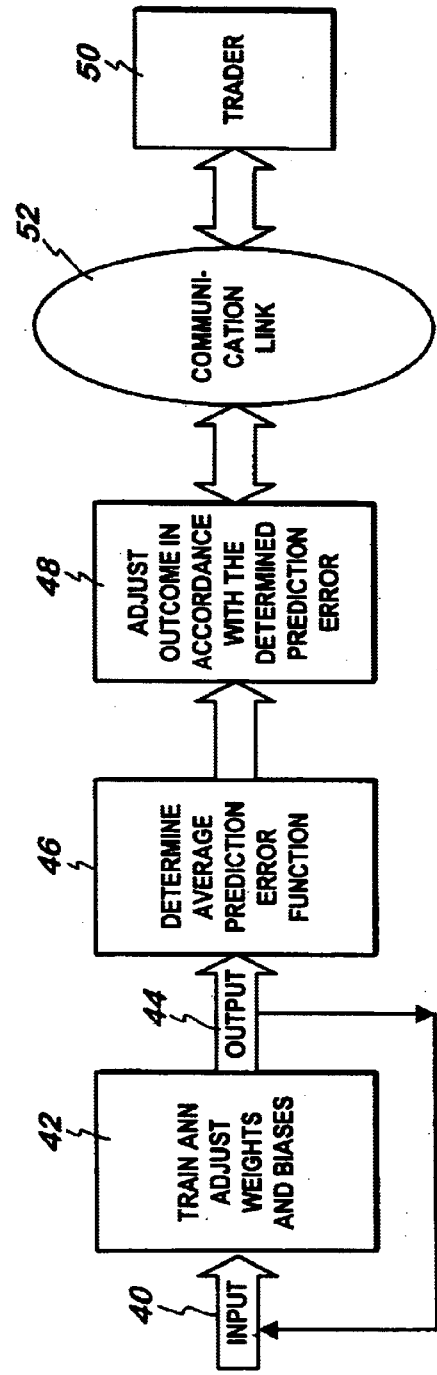
FIG. 4 is a flow chart illustrating an ANN engine of the universal time series prediction system shown in FIG. 3 and including a pre- and post-processing system for removing the deterministic trend from the data fed to the ANN engine and adding it to the processed data, respectively.
Figure 5:
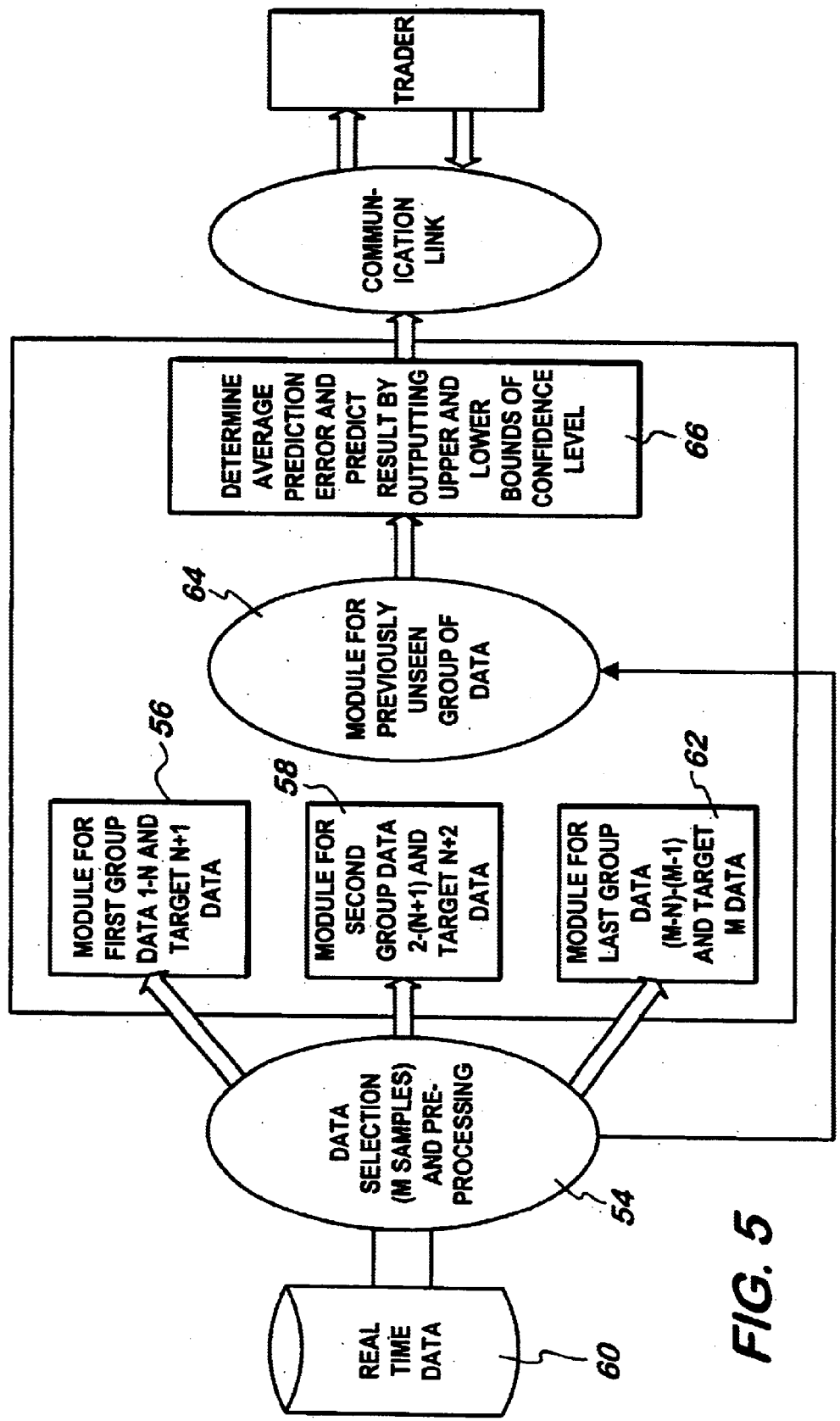
FIG. 5 is a flow chart illustrating the universal time series prediction system for financial securities shown in FIGS. 2–4.
Figure 6:
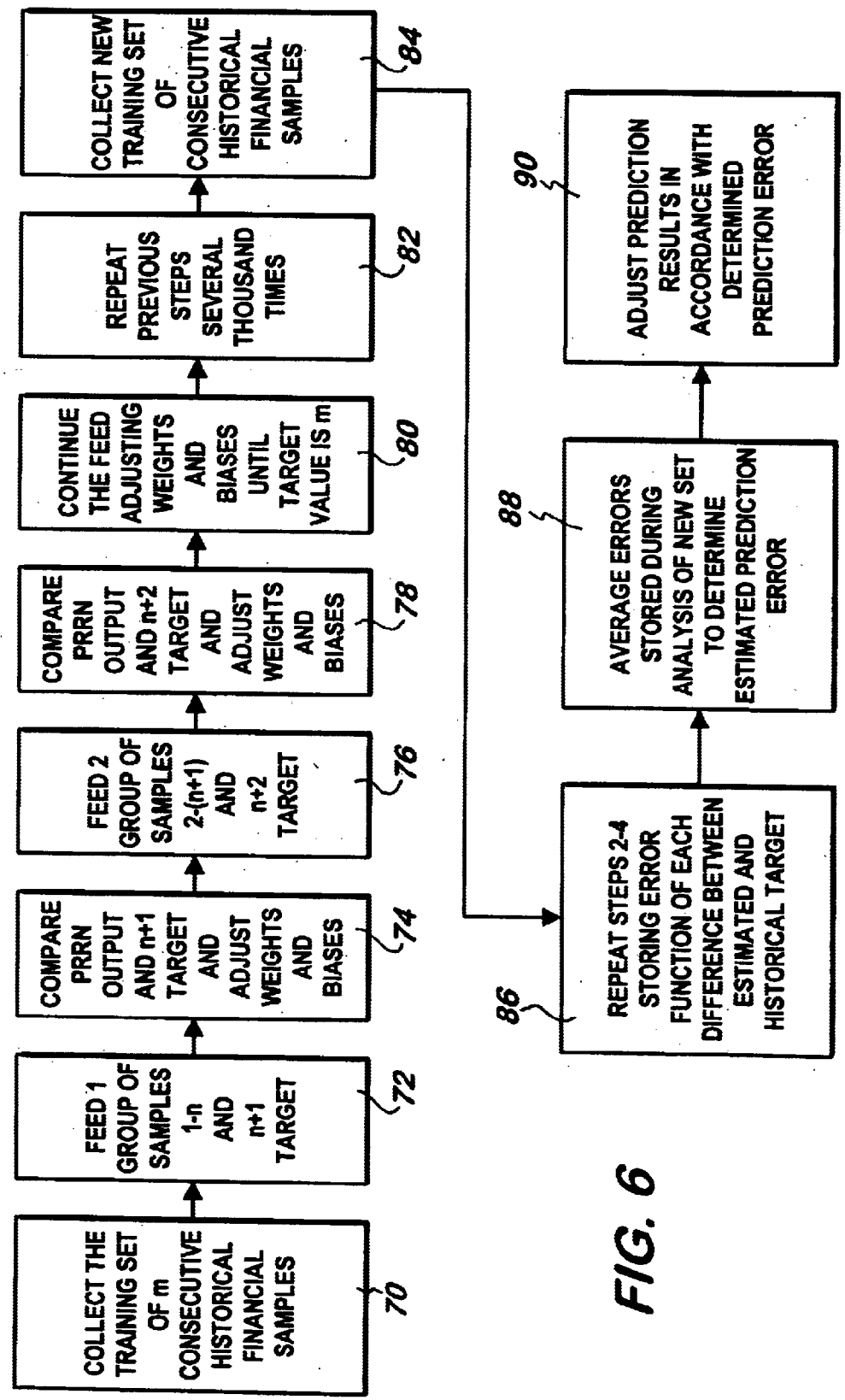
FIG. 6 is a flow chart illustrating a step-by-step process of training the universal time series prediction system for financial securities shown in FIGS. 2–5 in accordance with the present invention.

The Neural network prediction system shown in FIGS. 4–6 includes a computer receiving an input 40 from a powerful database 60 (FIG. 5), which in case of stock price predictions, will naturally be a plurality of historical stock prices and a known target. For instance, a vector of 100 consecutive stock prices constituting a training data and a price of the 101st stock price selected as a target data constitute a first training set.

The training set is fed into ANN 42 which processes this set in accordance with software executing on the computer in order to enable ANN to adjust its weights and biases after the ANN's output 58 has been repeatedly compared to the target data. After the input data is adjusted by the ANN 42 in such a manner that the ANN output 44 and the target data are close, a new set of historical data is fed in ANN 42 and, as the process is repeated, an error function of the ANN is determined and stored at 46 as an estimated prediction error which is applied to any future results predicted by ANN at 48.

Once the ANN is trained, any prediction of a short term price fluctuation of a stock which is presented with a probability range, as shown in FIG. 2, can be transmitted to a trader 50 through a communication link 62.

As shown in greater detail in FIG. 5, a set of M consecutive stock prices is selected and pre-processed at 54 in accordance with the pre-processed process described in reference to FIG. 4 and fed to ANN which is comprised of a plurality of modules 56, 58 and 62. Each of modules is basically a cell processing a uniform number N<M of the consecutive stock prices and a target data which is a stock price N+1. Thus, a first module 56 is adapted to process a first 1 through N stock prices, generating an output and compare it to the target price, which typically necessitates a certain correction in order to bring the output closer to the target data. Once the result is satisfactory, a next set of 2 through N+1 stock prices is fed and processed in order to be compared with the target value N+2, after which internal parameters once again are adjusted to minimize a function error of ANN. This process continues until the target data is the last M stock price of the first training set.

Subsequently, a second training set previously unseen by ANN is processed at 64 analogously to the first set, but in addition to adjusting the internal ANN parameters, an average prediction error is determined at 66, as will be explained in detail hereinbelow, and any future result transmitted through the communication link as explained in reference to FIG. 4.

FIG. 6 illustrates a step-by-step training process of ANN and includes a powerful computer distinguished for its high computational efficiency which allows the ANN to process any financial time series, price series and volatility series, for single securities and for portfolios of securities.

An adaptive supervised training and prediction process in accordance with the invention includes collecting the training set selected from a stored time series at 70. As disclosed above, the training set includes an input data for the ANN to "see" and the known supervised target data for the ANN to learn to output. After inputting subsequent groups of samples at 72 and 76, the ANN performs adjustment steps 74 and 78, respectively, to adjust its internal parameters so as to bring the ANN's output and the respective known target close to one another. As a consequence, an error function of the ANN is continuously minimized due to a great number of repetitions at 80 and 82. A new set selected from the same data but unknown to the ANN is collected at 84 to be processed in a one-step adaptive training stage. This procedure is similar to the previous one, but in addition to the adjustment of internal parameters, the difference between each output of the ANN and a respective target data is first determined and stored at 86 in order to determine an average prediction error at 88. Finally, all further predictions will be determined in accordance with the one-step stage 90 and automatically adjusted to incorporate the estimated prediction error.

The ANN engine uses a Component Object Module technique (COM) which provides the interfaces between modules and allows any COM support computer language and applications to call the inventive prediction system.

Although the invention has been described with reference to a particular arrangements of parts, features and the like, these are not intended to exhaust all possible arrangements or features, and indeed many other modifications and variations will be ascertainable to those of skill in the art.

What is claimed is:

1. A computer implemented method of training a recurrent artificial neural network (ANN) for prediction of a response in a time-variable financial series of values comprising the steps of:
   (a) collecting historical data comprised of a multiplicity of said values;
   (b) determining an expected trend of the data and removing the expected trend from the data, wherein the expected trend of the data is determined by quantities of particular items to be predicted, trading volume and volatility or spread of quantities with respect to time;
   (c) feeding a first group of said data to the recurrent ANN in a first training process;
   (d) adjusting weights and biases of the ANN in response to the first training process;
   (e) repeating steps (b) and (c) with additional groups of said values;
   (f) determining an error in successive values from step (d) after said plurality of repetitions, wherein the ANN error represents the difference between each ANN output and a respective target sample;
   (g) averaging said error over a plurality of the values;
   (h) selecting a particular item for which a prediction of a response is desired;
   (i) adjusting an output of ANN for the particular item with the determined average error; and
   (j) outputting upper and lower error bounds of the adjusted output defining therebetween a probability range within which the adjusted output is predicted to remain for a period of time without fluctuating beyond the upper and lower error bounds.

2. The method defined in claim 1 wherein the expected trend of the data is determined as $E=\Sigma w(f(x)-y)^2$, wherein x is time, y is the quantities of the particular item to be predicted, f is the expected trend to be determined, w is the trading volume divided by the volatility or spread of the quantities y at the time x.

3. The method defined in claim 1 wherein the determined trend is added to the adjusted output before the outputting the lower and upper bounds.

4. The method defined in claim 1 wherein the probability range varies up to 80%, thereby giving at least only 20% chances that the adjusted output falls outside of the range.

5. A computer implemented method of predicting the future behavior of a financial time series comprising the steps of:
   (a) collecting a first set representing a nonlinear financial time series of subsequent samples of a financial quantity combined in a plurality of groups, wherein the first sample of a subsequent group is a target sample of the previous group;
   (b) feeding the first group of the samples and the first target sample of the first set of samples to an Artificial Neural Network (ANN);
   (c) adjusting internal parameters of the ANN to minimize deviation of an ANN output from the target sample;
   (d) feeding a plurality of subsequent groups of samples and their respective target samples of the first set until the target sample is the last sample of the set, thereby continuously adjusting the internal parameters of the ANN upon comparing each subsequent ANN output to the respective target sample;
   (e) continuously re-feeding the previously processed groups of samples to gradually minimize an error function of the ANN between the ANN's output and the respective target value;
   (f) feeding a second set including a plurality of groups of samples and target samples to the ANN, thereby adjusting the internal parameters of the ANN in response to comparison between each new ANN output and a respective target sample;
   (f') simultaneously with the step (f) determining an ANN error function representing the difference between each ANN output and the respective target sample;
   (g) averaging the ANN error functions to determine an ANN estimated prediction error;
   (h) predicting future results from any processed group of samples different from the first and second sets by adjusting the ANN output with the estimated prediction error; and
   (i) outputting upper and lower error bounds of the adjusted ANN output at a given confidence level.

6. The method defined in claim 5 further comprising the steps of determining an expected trend of financial time series of subsequent samples representing each of the processed sets, removing the trend before processing of the groups of the respective set, and adding the trend before predicting the adjusted output.

7. The method defined in claim 6 further comprising the step of responding to any support computer language and applications using a Component Object Module technique.

8. A computer implemented method of training a recurrent artificial neural network (ANN) for prediction of a response in a time-variable financial series of values comprising the steps of:
   (a) collecting historical data comprised of a multiplicity of said values;
   (b) feeding the first group of said data to the recurrent ANN in a first training process;
   (c) adjusting weights and biases of the ANN in response to the first training process;
   (d) repeating steps (b) and (c) with additional groups of said values;
   (e) determining an error in successive values after said plurality of repetitions, wherein the ANN error represents the difference between each ANN output and a respective target sample;
   (f) averaging said error over a plurality of the values;
   (g) selecting a particular item for which a prediction of a response is desired; and
   (h) adjusting an output of ANN for the particular item with the determined average error.

9. The method defined in claim 8 wherein the step of feeding the first group of said historical data includes a step of feeding a first historically known target which is a value subsequent to the last value of said first group.

10. The method defined in claim 9 further comprising the step of generating an output by the ANN and comparing it with the target value, said weights and biases being adjusted to minimize an error function representing the difference between the output of the first training process and first historically known target.

11. The method defined in claim 8 wherein the first training process is repeated several thousand times, thereby adjusting internal weights and biases to gradually eliminate the error function.

12. The process defined in claim 8 wherein each of the additional groups of said values is fed to the ANN along with a respective target representing a value subsequent to the last one of the additional group, feeding of the additional groups of the values continues until the target is the last value from the collected data.

13. The method defined in claim 8 wherein each of the determined errors in successive values is stored.

14. The method defined in claim 8 wherein the comparison between the successive values and the respective target in step (e) is a one step training process.

15. The method defined in claim 8 wherein the time-variable financial series includes the group consisting of stock price series, bond price series, portfolios of securities, and volatility series.

16. The method defined in claim 8 wherein the adjusted output of ANN for the particular item is represented by a pair of upper and lower error bounds at a given confidence level, said confidence level being up to 80%.

17. An artificial neural prediction network system having a pipelined recurrent ANN (PRNN) architecture designed to train the ANN to predict with confidence, comprising:
a computer;
software executing on the computer for collecting a first set representing a nonlinear financial time series of subsequent samples of a financial quantity combined in a plurality of groups, wherein the first sample of a subsequent group is a target sample of the previous group;
a database having the collected set of samples of the financial security;
software executing on the computer for initially feeding the first group of the samples and the first target sample of the stored first set of samples; software executing on the computer for processing the first group of samples and for adjusting the internal parameters of the PRNN to minimize deviation of the output from the target sample;
software executing on the computer for feeding a plurality of subsequent groups of samples and their respective target samples of the first stored set until the target sample is the last sample of the set, thereby continuously adjusting the internal parameters of the ANN upon comparing each subsequent output of the ANN to the respective target sample;
software executing on the computer for continuously feeding the previously processed groups of samples to obtain a minimal level of the deviation between the ANN's output and the respective target value;
software executing on the computer for storing a second set of groups of samples in the database;
software executing on the computer for determining a prediction error between an output of the ANN in response to feeding each of the groups of samples of the second set and the respective target value;
software executing on the computer for averaging the prediction errors of the second set to obtain an estimated prediction error;
software executing on the computer for predicting future results from any processed group of samples different from the first and second sets, each subsequent future result being adjusted in accordance with the estimated prediction error; and
software executing on the computer for outputting upper and lower error bounds of the adjusted ANN output at a given confidence level.

18. The system defined in claim 17 further comprising software for determining an expected trend of financial time series of subsequent samples representing each of the processed sets, removing the trend before processing of the groups of the respective set, and adding the trend before predicting the adjusted output of a single security or a portfolio of securities.

19. The system defined in claim 17 wherein the given confidence level is up to 80%.

20. The system defined in claim 17 wherein the PRNN architecture uses a Component Object Module technique, so that said system can be readily called by any COM support computer language and applications.

21. A system employing a Recurrent ANN architecture (ANN) for prediction of a response in a time-variable financial series of values comprising:
a computer;
a database having a collected historical data comprised of a multiplicity of groups of successive time variable financial values;
software executed on the computer for continuously feeding a first group of said collected historical data to the ANN and comparing each subsequent output of the ANN with a target value which is selected from the historical data in a first training process;
software executed on the computer for adjusting weights and biases of the ANN in response to a plurality of repetitions of the first training process;
software for continuously feeding at least one second group of said collected historical data to the ANN and comparing its output to a respective target value selected from the historical data in a second training process;
software executed on the computer for adjusting weights and biases of the ANN in response to a plurality of repetitions of the second training process;
software for feeding a third group of said stored data and determining an ANN prediction error function in response to comparing the third group of said data to a respective target value;
software for selecting a particular item for which a prediction of a response is desired; and
software for adjusting the output of ANN for the particular item with the determined prediction error.

22. The system defined in claim 21 further comprising software executed on the computer for outputting upper and lower error bounds of the adjusted ANN output at a given confidence level.

23. The system defined in claim 21 wherein each target value of the respective training process is a value of the historical data which is subsequent to the last value of a previous group of values processed during a respective one of the training processes.

* * * * *